United States Patent
Li et al.

(10) Patent No.: US 11,528,217 B2
(45) Date of Patent: Dec. 13, 2022

(54) PATH SWITCHING METHOD AND RELATED APPARATUS

(71) Applicant: Huawei Technologies Co., Ltd., Shenzhen (CN)

(72) Inventors: Dongdong Li, Nanjing (CN); Pu Cheng, Nanjing (CN); Ying Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 165 days.

(21) Appl. No.: 17/100,530

(22) Filed: Nov. 20, 2020

(65) Prior Publication Data

US 2021/0160168 A1    May 27, 2021

(30) Foreign Application Priority Data

Nov. 21, 2019 (CN) .......................... 201911151997.X (51) Int. Cl.
*H04L 45/12* (2022.01)
*H04L 47/125* (2022.01)

(52) U.S. Cl.
CPC .......... *H04L 45/123* (2013.01); *H04L 47/125* (2013.01)

(58) Field of Classification Search
CPC ..... H04L 45/123; H04L 47/125; H04L 45/02; H04L 45/745; H04L 45/24; H04L 45/28; H04L 45/22
See application file for complete search history.

(56) References Cited

U.S. PATENT DOCUMENTS

| | | | |
|---|---|---|---|
| 2015/0029855 A1* | 1/2015 | Zheng | H04L 45/16 370/235 |
| 2015/0138957 A1* | 5/2015 | Kaushik | H04L 41/0659 370/228 |
| 2016/0241463 A1* | 8/2016 | D'Souza | H04L 45/28 |
| 2020/0186460 A1* | 6/2020 | Power | H04L 45/22 |

FOREIGN PATENT DOCUMENTS

CN          110417569 A     11/2019

* cited by examiner

*Primary Examiner* — Pao Sinkantarakorn
*Assistant Examiner* — Kabir U Jahangir
(74) *Attorney, Agent, or Firm* — Leydig, Voit & Mayer, Ltd.

(57) ABSTRACT

This application provides a path switching method and a related apparatus. In the path switching process, an ECMP table includes a first ECMP index of a first path group and a second ECMP index of a second path group; when all paths in the first path group have failed, a path group identifier corresponding to the first ECMP index may be changed from valid to invalid in the ECMP table, indicating that all paths in the first path group are unavailable. In this case, a path group identifier corresponding to the second ECMP index is valid, indicating that the second path group includes an available path, thereby completing switching between an active path and a standby path. In this process, only an identifier corresponding to the ECMP index needs to be updated, and therefore, the time consumed is relatively short, and the path switching delay can be effectively reduced.

12 Claims, 5 Drawing Sheets

PATH SWITCHING METHOD AND RELATED APPARATUS

CROSS-REFERENCE TO RELATED APPLICATION

This application claims priority to Chinese Patent Application No. 201911151997.X, filed on Nov. 21, 2019, which is hereby incorporated by reference in its entirety.

TECHNICAL FIELD

This application relates to the field of communication technologies, and in particular, to a path switching method and a related apparatus.

BACKGROUND

Equal cost multipath (ECMP) means that there are a plurality of routing paths of equal value but including different intermediate nodes to the same target Internet Protocol (IP) address or target network segment. When the network device supports equal cost multipath, traffic destined for the same target IP address or target network segment can be sent through different paths, so as to implement load balancing of the network. When one of the paths fails, other normal paths replace the failed path to perform forwarding, thereby implementing route redundancy backup.

Figure 1:
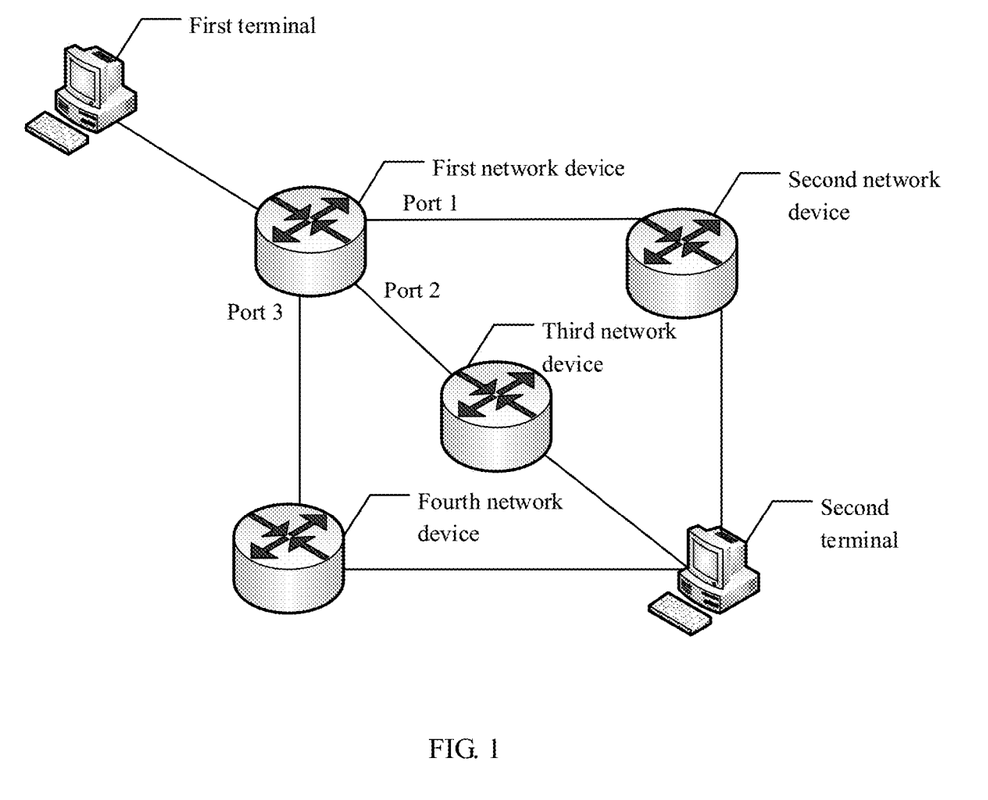
FIG. 1 is a schematic diagram of a network architecture including equal cost multipath.

FIG. 1 is a schematic diagram of a network architecture including equal cost multipath. As shown in FIG. 1, when a first terminal needs to send a packet to a second terminal (including an IP address of the second terminal), the packet may be forwarded through a plurality of paths, where the two active paths are: the first terminal→a first network device→a second network device→the second terminal, and the first terminal→the first network device→a third network device→the second terminal, and the standby path is: the first terminal→the first network device→a fourth network device→the second terminal. In this case, the two active paths constitute equal cost multipath.

The first network device is generally provided with a routing and forwarding table. The routing and forwarding table includes a correspondence between a route prefix and an ECMP index. The ECMP index is used to indicate equal cost multipath for sending a packet to a corresponding IP address. For example, if the IP address of the second terminal is IP address 1, ECMP1 in Table 1 corresponds to two active paths in FIG. 1.

TABLE 1

| Prefix | ECMP index |
| --- | --- |
| IP address 1/mask 1 | ECMP1 |
| IP address 2/mask 2 | ECMP2 |
| ... | ... |

The first network device is further provided with an ECMP table corresponding to each ECMP index. The ECMP table is shown in Table 2. The ECMP mainly contains information about the ECMP index. For example, ECMP1 corresponds to two active paths. In the first active path, the next hop (NHP) of the first network device is the second network device (the corresponding NHP index is NHP1); and in the second active path, the NHP of the first network device is the third network device (the corresponding NHP index is NHP2). Because the first active path is a start path, the corresponding start path NHP index of ECMP1 is NHP1.

TABLE 2

| ECMP index | Quantity of paths | Start path NHP index |
| --- | --- | --- |
| ECMP1 | 2 | NHP1 |
| ECMP2 | 3 | NHP4 |
| ... | ... | ... |

The first network device is further provided with an NHP table corresponding to each ECMP index. The NHP table corresponding to ECMP1 includes all paths corresponding to ECMP1. Each entry of the NHP table corresponds to one path. For example, NHP1+ port 1 represents the first active path, and NHP2+ port 2 represents the second active path.

TABLE 3

| NHP index | Port |
| --- | --- |
| NHP1 | Port 1 |
| NHP2 | Port 2 |

When finding that all the active paths in FIG. 1 have failed, the first network device needs to switch to the standby path for packet forwarding. In this case, entries need to be updated. Specifically, the first network device not only needs to modify the start path NHP index corresponding to ECMP1 in the ECMP table from NHP1 to NHP_Backup (corresponding to the fourth network device), but also needs to modify the quantity of paths corresponding to ECMP1 to 1 to complete active-standby path switching.

In the process of active-standby path switching, the network device needs to update the content of the ECMP table, and because too much content needs to be modified and the update time consumed is too long, the path switching delay is high.

SUMMARY

This application provides a path switching method and a related apparatus, so as to effectively reduce a path switching delay.

A first aspect of this application provides a path switching method.

When running normally, a network device needs to maintain a forwarding table for packet forwarding. The forwarding table includes an ECMP table. The ECMP table includes a first ECMP index of a first path group, a first path group identifier corresponding to the first ECMP index, a second ECMP index of a second path group, and a second path group identifier corresponding to the second ECMP index. The second path group is a standby path group of the first path group. If the path group identifier corresponding to a path group is set to be valid, the path group includes an available path; or if the path group identifier is set to be invalid, the path group does not include an available path.

If the network device determines that all paths in the first path group have failed, the first path group identifier corresponding to the first ECMP index is set to be invalid in the ECMP table. In this case, because the first path group identifier is set to be invalid, indicating the first path group does not include an available path, and the second path group identifier is set to be valid (a specified default value), indicating that the second path group includes an available path, the active-standby path switching is completed.

In the path switching process, only the identifier corresponding to the ECMP index needs to be updated in the ECMP table, and therefore, the time consumed is relatively short, and the path switching delay can be effectively reduced.

In a possible implementation of the first aspect, the forwarding table maintained by the network device further includes a first NHP table, where the first NHP table includes each path in the first path group and a path identifier corresponding to each path in the first path group. If the path identifier of a path in the first path group is set to be valid, it indicates that the path is available; or if the path identifier is set to be invalid, it indicates that the path is unavailable.

In the foregoing implementation, each path in the first NHP table has a corresponding path identifier, where the path identifier can be used to indicate whether the corresponding path is available, so that the first NHP table can reflect the status of each path, thereby improving the feasibility and flexibility of the solution.

In a possible implementation of the first aspect, if the network device determines that a path in the first path group has failed, the path identifier corresponding to the failed path is set to be invalid in the first NHP table. For example, when finding that a path in the first path group has failed, the network device may set a path identifier corresponding to the failed path to be invalid in the first NHP table to indicate that the path is unavailable.

In the foregoing implementation, the network device may update a path identifier in the first NHP table based on the path status of the first path group, so that the first NHP table can accurately show the status of each path based on the path identifier, thereby further improving the feasibility and flexibility of the solution.

In a possible implementation of the first aspect, if all paths in the first path group have failed, setting the first path group identifier corresponding to the first ECMP index to be invalid in the ECMP table includes: setting the first path group identifier corresponding to the first ECMP index to be invalid in the ECMP table if the network device determines that all the path identifiers in the first NHP table are set to be invalid. Specifically, when the network device finds that none of the paths in the first path group is available, that is, the path identifiers corresponding to all the paths in the first NHP table are set to be invalid, the first path group identifier corresponding to the first ECMP index in the ECMP table is set to be invalid, indicating that the first path group is unavailable. In this case, because the second ECMP index of the second path group is set to be valid, the first path group is successfully switched to the second path group, that is, the active path group is switched to the standby path group, that is, the active path group is switched to the standby path group, and the active-standby path switching is completed.

In a possible implementation of the first aspect, the forwarding table maintained by the network device further includes a routing and forwarding table, where the routing and forwarding table includes a route prefix, the first ECMP index and the second ECMP index, where the first ECMP index and the second ECMP correspond to the route prefix.

In the foregoing implementation, after receiving a packet, the network device may obtain a corresponding first ECMP index and a corresponding second ECMP index from the routing and forwarding table based on the route prefix in the packet, so that the first path group and the second path group used for forwarding the packet can be determined, thereby improving the feasibility and flexibility of the solution.

In a possible implementation of the first aspect, the forwarding table maintained by the network device further includes a second NHP table, where the second NHP table includes each path in the second path group and a path identifier corresponding to each path in the second path group. If the path identifier of a path in the second path group is set to be valid, the path is available; or if the path identifier is set to be invalid, the path is unavailable.

In the foregoing implementation, each path in the second NHP table has a corresponding path identifier, where the path identifier can be used to indicate whether the corresponding path is available, so that the second NHP table can reflect the status of each path, thereby improving the feasibility and flexibility of the solution.

A second aspect of this application further provides a network device, where the network device includes:

a maintenance module, configured to maintain an equal cost multipath ECMP table, where the ECMP table includes a first ECMP index of a first path group, a first path group identifier corresponding to the first ECMP index, a second ECMP index of a second path group, and a second path group identifier corresponding to the second ECMP index, where the second path group is a standby path group of the first path group; and if a path group identifier corresponding to a path group is set to be valid, the path group includes an available path, or if the path group identifier is set to be invalid, the path group does not include an available path; and a first setting module, configured to set the first path group identifier corresponding to the first ECMP index in the ECMP table to be invalid if all paths in the first path group have failed.

In a possible implementation of the second aspect, the maintenance module is further configured to maintain a first next-hop NHP table, where the first NHP table includes each path in the first path group and a path identifier corresponding to each path in the first path group; and if the path identifier of a path in the first path group is set to be valid, the path is available, or if the path identifier is set to be invalid, the path is unavailable.

In a possible implementation of the second aspect, the network device further includes a second setting module, configured to: when a path in the first path group has failed, set a path identifier corresponding to the failed path to be invalid in the first NHP table.

In a possible implementation of the second aspect, the first setting module is configured to set the first path group identifier corresponding to the first ECMP index to be invalid in the ECMP table if all the path identifiers in the first NHP table are set to be invalid.

In a possible implementation of the second aspect, the maintenance module is further configured to maintain a routing and forwarding table, where the routing and forwarding table includes a route prefix, the first ECMP index and the second ECMP index, where the first ECMP index and the second ECMP correspond to the route prefix.

In a possible implementation of the second aspect, the maintenance module is further configured to maintain a second NHP table, where the second NHP table includes each path in the second path group and a path identifier corresponding to each path in the second path group; and if the path identifier of a path in the second path group is set to be valid, the path is available, or if the path identifier is set to be invalid, the path is unavailable.

A third aspect of this application further provides a network device, where the network device includes a processor and a memory, where the network device may further include an input/output interface, a wired or wireless network interface, and a power supply. The memory is configured to store program code.

The processor is configured to communicate with the memory and execute the program code in the memory to enable the network device to perform the method according to any one of the first aspect or possible implementations of the first aspect.

A fourth aspect of this application further provides a computer-readable storage medium, where the computer-readable storage medium stores an instruction, and when the instruction runs on a computer, the computer is enabled to perform the method according to any one of the first aspect or possible implementations of the first aspect.

A fifth aspect of this application further provides a computer program product including an instruction, where when the computer program product runs on a computer, the computer is enabled to perform the method according to any one of the first aspect or possible implementations of the first aspect.

According to the path switching method and the related apparatus provided in this application, an ECMP table includes a first ECMP index of a first path group and a second ECMP index of a second path group; when all paths in the first path group have failed, a path group identifier corresponding to the first ECMP index may be changed from valid to invalid in the ECMP table, indicating that all paths in the first path group are unavailable. In this case, a path group identifier corresponding to the second ECMP index is valid, indicating that the second path group includes an available path, thereby completing switching between an active path and a standby path. In this process, only an identifier corresponding to the ECMP index needs to be updated, and therefore, the time consumed is relatively short, and the path switching delay can be effectively reduced.

DESCRIPTION OF EMBODIMENTS

An embodiment of this application provides a path switching method and a related apparatus, so as to effectively reduce a path switching delay.

The technical solutions in the embodiments of this application can be applied to the network architecture shown in FIG. 1. When the first terminal needs to send a packet to the second terminal, after receiving the packet, the first network device can send the packet to a next-hop device, so that the next-hop device continues to forward the packet until the packet is sent to the second terminal.

For the first network device, in the network architecture shown in FIG. 1, one of two active paths can be selected by the first network device to forward a packet. When the two active paths are available, the first network device can select one of the two active paths to forward the packet; or when all the active paths are unavailable, the first network device needs to switch between the active path and the standby path, so as to forward the packet by using the standby path.

Specifically, the first network device maintains a forwarding table for packet forwarding in real time. The forwarding table generally records information about a path available for forwarding a packet, such as information about the active path and the standby path shown in FIG. 1. When the first network device receives a packet that needs to be forwarded, the first network device searches the forwarding table, obtains information about the active path from the forwarding table based on priorities of the active path and the standby path, and selects an active path to forward the packet. The forwarding table includes a routing and forwarding table, an ECMP table, an NHP table, or the like. Each type of forwarding table contains its information. Details are not described herein. When the first network device determines that all the active paths have failed, the active-standby path switching needs to be performed; that is, the path information in the forwarding table needs to be updated in time, and the status of the active paths are updated to be unavailable, so that the available standby path can be preferentially selected, and then the path switching is completed, so as to prevent packet loss.

Figure 2:
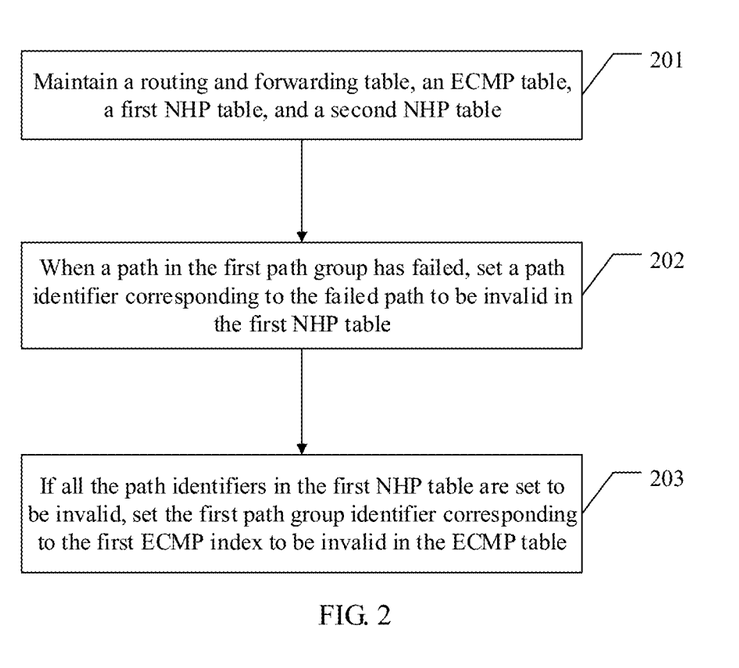
FIG. 2 is a schematic flowchart of a path switching method according to an embodiment of this application.

To improve the efficiency of path switching, an embodiment of this application provides a path switching method. The following describes the embodiment of this application in detail from the perspective of a network device. FIG. 2 is a schematic flowchart of a path switching method according to this embodiment of this application. The method includes:

201. Maintain a routing and forwarding table, an ECMP table, a first NHP table, and a second NHP table.

When the network device is in a working state, generally, a forwarding table for forwarding a packet needs to be maintained, including the routing and forwarding table, the ECMP table, the first NHP table, the second NHP table, and the like, which are described below.

(1) The routing and forwarding table includes a correspondence between a route prefix and an ECMP index. The routing and forwarding table may further include other information, such as a VPN identifier. Specifically, each route prefix in the routing and forwarding table corresponds to two ECMP indexes, that is, a first ECMP index of the first path group and a second ECMP index of the second path group, where the first path group is an active path group, and the second path group is a standby path group of the first path group. Therefore, the first ECMP index and the second ECMP index may constitute one active-standby index pair, where one active-standby index pair corresponds to one route prefix. For ease of understanding, the routing and forwarding table is described below in detail with reference to Table 4.

TABLE 4

| Route prefix | Virtual private network (VPN) identifier | ECMP index |
| --- | --- | --- |
| IP address 1/mask 1 | VPN1 | ECMP1, ECMP2 |
| IP address 2/mask 2 | VPN2 | ECMP3, ECMP4 |
| ... | ... | ... |

Because a packet includes information such as a route prefix (including an IP address and a mask) and a VPN, when the network device receives a packet, a first ECMP index and a second ECMP index corresponding to the route prefix may be determined based on the route prefix in the packet, and then a first path group and a second path group that are used to forward the packet are determined. Still using the example shown in FIG. 1, it is assumed that the IP address of the second terminal is IP address 1. After the first network device receives a packet that needs to be sent by the first terminal to the second terminal, the first network device can parse the packet to determine that the IP address in the packet is IP address 1. Based on IP address 1, it can be determined, in Table 4, that the corresponding ECMP indexes are ECMP1 and ECMP2, and then it is determined that the path groups used to forward the packet include a path group corresponding to ECMP1 and a path group corresponding to ECMP2, where ECMP1 corresponds to an active path group (that is, two active paths in FIG. 1), and ECMP2 corresponds to a standby path group (that is, standby paths in FIG. 1).

(2) The ECMP table includes information about the active and standby indexes corresponding to the route prefix. For example, the ECMP table includes information about the first ECMP index and the second ECMP index corresponding to the route prefix. The ECMP table in this embodiment may be presented in a plurality of manners. For example, the network device maintains only one ECMP table, and information about the active and standby indexes corresponding to all the route prefixes may be recorded in the same ECMP table. For another example, the network device maintains a plurality of ECMP tables at a time, and each ECMP table records only information about the active and standby indexes corresponding to one route prefix. This is not specifically limited herein.

Specifically, each entry in the ECMP table is information about an ECMP index, and content of one entry includes an ECMP index, and a quantity of paths corresponding to the ECMP index, a start path NHP index, and a path group identifier, where the quantity of paths is used to indicate the quantity of paths in the path group corresponding to the ECMP index, the start path NHP index is used to indicate the start path in the path group corresponding to the ECMP index, and the path group identifier is used to indicate whether the path group corresponding to the ECMP index includes an available path. When the path group identifier is set to be valid (for example, a value of 1), it indicates that the path group includes an available path; or when the path group identifier is set to be invalid (for example, a value of 0), it indicates that the path group does not include an available path. For ease of understanding, the ECMP table is described below in detail with reference to Table 5.

TABLE 5

| ECMP index | Quantity of paths | Start path NHP index | Path group identifier |
|---|---|---|---|
| ECMP1 | 2 | NHP1 | 1 |
| ECMP2 | 1 | NHP3 | 1 |
| ECMP3 | 3 | NHP4 | 1 |
| . . . | . . . | . . . | . . . |

Based on the ECMP table shown in Table 5, the network device may determine whether a path group corresponding to an ECMP index is available. Still using the example shown in FIG. 1, because the active and standby indexes corresponding to the packets sent by the first terminal to the second terminal are ECMP1 and ECMP2, respectively, the first network device may determine the following information in Table 5: The value of the path group identifier corresponding to ECMP1 is 1, indicating that the active path group corresponding to ECMP1 includes an available path;

and the value of the path group identifier corresponding to ECMP2 is also 1, indicating that the standby path group corresponding to ECMP2 includes an available path. In this application, the default value of the path group identifier corresponding to each ECMP index is 1, that is, each path group identifier is set to a valid state by default.

In addition, the network device may obtain the corresponding NHP table based on the start path NHP index in Table 5. Still using the example shown in FIG. 1, because the route prefix in FIG. 1 corresponds to ECMP1 and ECMP2, the first network device needs to obtain the NHP table corresponding to ECMP1 or ECMP2. In Table 5, ECMP1 and ECMP2 constitute an active-standby index pair. The first network device may first determine that the start path NHP index corresponding to ECMP1 is NHP1, and then obtain a first NHP table corresponding to NHP1. The first NHP table includes each path in the first path group corresponding to ECMP1, and the start path in the first path group corresponds to NHP1. Likewise, the first network device may further determine that the start path NHP index corresponding to ECMP2 is NHP3, and then obtain a second NHP table corresponding to NP3 of the start path. The second NHP table includes each path in the second path group corresponding to ECMP2, and the start path in the second path group is NHP3. It should be noted that the first NHP table and the second NHP table constitute an active/standby NHP table pair, and the active/standby NHP table pair correspond to an active-standby index pair.

It should be understood that, for ease of description, the ECMP table shown in Table 5 is presented in the first presentation manner. This is merely an example and does not constitute a limitation on the presentation manner of ECMP in this embodiment.

(3) The first NHP table and the second NHP table. Based on the foregoing description, it can be understood that one route prefix corresponds to one active-standby index pair, and one active-standby index pair corresponds to one active/standby NHP table pair. In one active/standby NHP table pair, the first NHP table includes each path in the first path group and a path identifier corresponding to each path in the first path group. Likewise, the second NHP table includes each path in the second path group and a path identifier corresponding to each path in the second path group. If the path identifier of a path is set to be valid, the path is available; or if the path identifier is set to be invalid, the path is unavailable. For ease of understanding, the first NHP table and the second NHP table are respectively described below with reference to Table 6 and Table 7. It should be noted that the path information included in Table 6 and Table 7 is based on the network architecture shown in FIG. 1; that is, Table 6 includes each path in the first path group corresponding to ECMP1, and Table 7 includes each path in the second path group corresponding to ECMP2.

TABLE 6

| Path NHP index | Source media access control (MAC) address | Destination MAC address | Virtual local area network (VLAN) | Port | Path identifier |
|---|---|---|---|---|---|
| NHP1 | MAC1 | MAC2 | VLAN1 | Port 1 | 1 |
| NHP2 | MAC1 | MAC3 | VLAN2 | Port 2 | 1 |

TABLE 7

| Path NHP index | Source MAC address | Destination MAC address | VLAN | Port | Path identifier |
|---|---|---|---|---|---|
| NHP3 | MAC1 | MAC4 | VLAN3 | Port 3 | 1 |

In the first NHP table shown in Table 6, each entry is an active path of the first path group corresponding to ECMP 1. For example, the entry corresponding to NHP1 is the first active path (start path) in the first path group, and the entry corresponding to NHP1 contains various information, such as a source MAC address (a MAC address of a current network device, that is, a MAC address of the first network device), a destination MAC address (a MAC address of a next-hop device of the path, that is, a MAC address of the second network device), a VLAN, and a port. It should be noted that the entry further includes a path identifier corresponding to the first active path; and when the path identifier is set to be valid (for example, a value of 1), it indicates that the first active path is available, or when the path identifier is set to be invalid (for example, a value of 0), it indicates that the first active path is unavailable. Likewise, the entry corresponding to NHP2 is the second active path in the first path group. For the description of the entry, reference may be made to the description of the entry corresponding to NHP1. Details are not described herein again.

In the second NHP table shown in Table 7, each entry is a standby path in the second path group corresponding to ECMP2. For example, the entry corresponding to NHP3 is the first standby path (start path) in the second path group, and the entry corresponding to NHP3 contains various information, such as a source MAC address (a MAC address of a current network device, that is, a MAC address of the first network device), a destination MAC address (a MAC address of a next-hop device of the path, that is, a MAC address of a fourth network device), a VLAN, and a port. It should be noted that the entry further includes a path identifier corresponding to the first standby path; and when the path identifier is set to be valid (for example, a value of 1), it indicates that the first standby path is available, or when the path identifier is set to be invalid (for example, a value of 0), it indicates that the first standby path is unavailable.

In summary, the first network device may determine, based on Table 6, available active paths included in the first path group corresponding to ECMP1, or may determine, based on Table 7, available standby paths included in the second path group corresponding to ECMP2.

In this application, a default value of a path identifier corresponding to each path is 1; that is, each path identifier is set to a valid state by default.

It should be understood that in the content shown in Table 6, the first path group includes only two active paths. This is merely an example and does not constitute a limitation on the quantity of the active paths in the first path group in the this embodiment.

It should also be understood that in the content shown in Table 7, the second path group includes only one standby path. This is merely an example and does not constitute a limitation on the quantity of standby paths in the second path group in the this embodiment.

202. When a path in the first path group has failed, set a path identifier corresponding to the failed path to be invalid in the first NHP table.

If the network device determines that a path in the first path group has failed, the path identifier corresponding to the failed path is set to be invalid in the first NHP table. Still using in the example shown in FIG. 1, when the first network device receives failure information returned by port 1, it may be determined that the first active path of the first network device in the first path group corresponding to ECMP1 has failed. Therefore, the first network device may set the path identifier corresponding to the first active path to be invalid in the first NHP table maintained by the first network device (that is, Table 6), that is, change the value of the path identifier to 0, indicating that the first active path is unavailable.

203. If all the path identifiers in the first NHP table are set to be invalid, set the first path group identifier corresponding to the first ECMP index to be invalid in the ECMP table.

If the network device determines that all the path identifiers in the first NHP table are set to be invalid, the identifier of the first path group corresponding to the first ECMP index is set to be invalid in the ECMP table. For example, based on the example shown in step 202, when the first network device further receives failure information returned by port 2, it may be determined that the second active path of the first network device in the first path group corresponding to ECMP1 has failed. Therefore, the first network device may set the path identifier corresponding to the second active path to be invalid in the first NHP table maintained by the first network device (that is, Table 6), that is, change the value of the path identifier to 0, indicating that the second active path is unavailable. In this case, if all the paths in the first path group corresponding to ECMP1 are unavailable, switching to the second path group corresponding to ECMP2 needs to be performed, so as to provide a standby path to forward a packet that needs to be sent by the first terminal to the second terminal. Therefore, after determining that all the path identifiers in Table 6 are 0, the first network device modifies the path group identifier corresponding to ECMP1 in Table 5 to 0, indicating that the first path group corresponding to ECMP1 is unavailable. Because the path group identifier corresponding to ECMP2 is 1, indicating that the second path group corresponding to ECMP2 includes an available path, the first network device completes active-standby path switching. The modified Table 5 is shown in Table 8, and the modified Table 6 is shown in Table 9.

TABLE 8

| ECMP index | Quantity of paths | Start path NHP index | Path group identifier |
|---|---|---|---|
| ECMP1 | 2 | NHP1 | 0 |
| ECMP2 | 1 | NHP3 | 1 |
| ECMP3 | 3 | NHP4 | 1 |
| ... | ... | ... | ... |

TABLE 9

| Path NHP index | Source MAC address | Destination MAC address | VLAN | Port | Path identifier |
|---|---|---|---|---|---|
| NHP1 | MAC1 | MAC2 | VLAN1 | Port 1 | 0 |
| NHP2 | MAC1 | MAC3 | VLAN2 | Port 2 | 0 |

In this embodiment, the ECMP table includes a first ECMP index of the first path group and a second ECMP index of the second path group. When all the paths in the first path group have failed, the path group identifier corresponding to the first ECMP index may be changed from valid to invalid in the ECMP table, indicating that all the paths in the first path group are unavailable. In this case, the path group identifier corresponding to the second ECMP index is valid, indicating that the second path group includes an available path; and active-standby path switching is completed. In this process, only the identifier corresponding to the ECMP index needs to be updated, and the required time is relatively short, so that the path switching delay can be effectively reduced.

Figure 3:
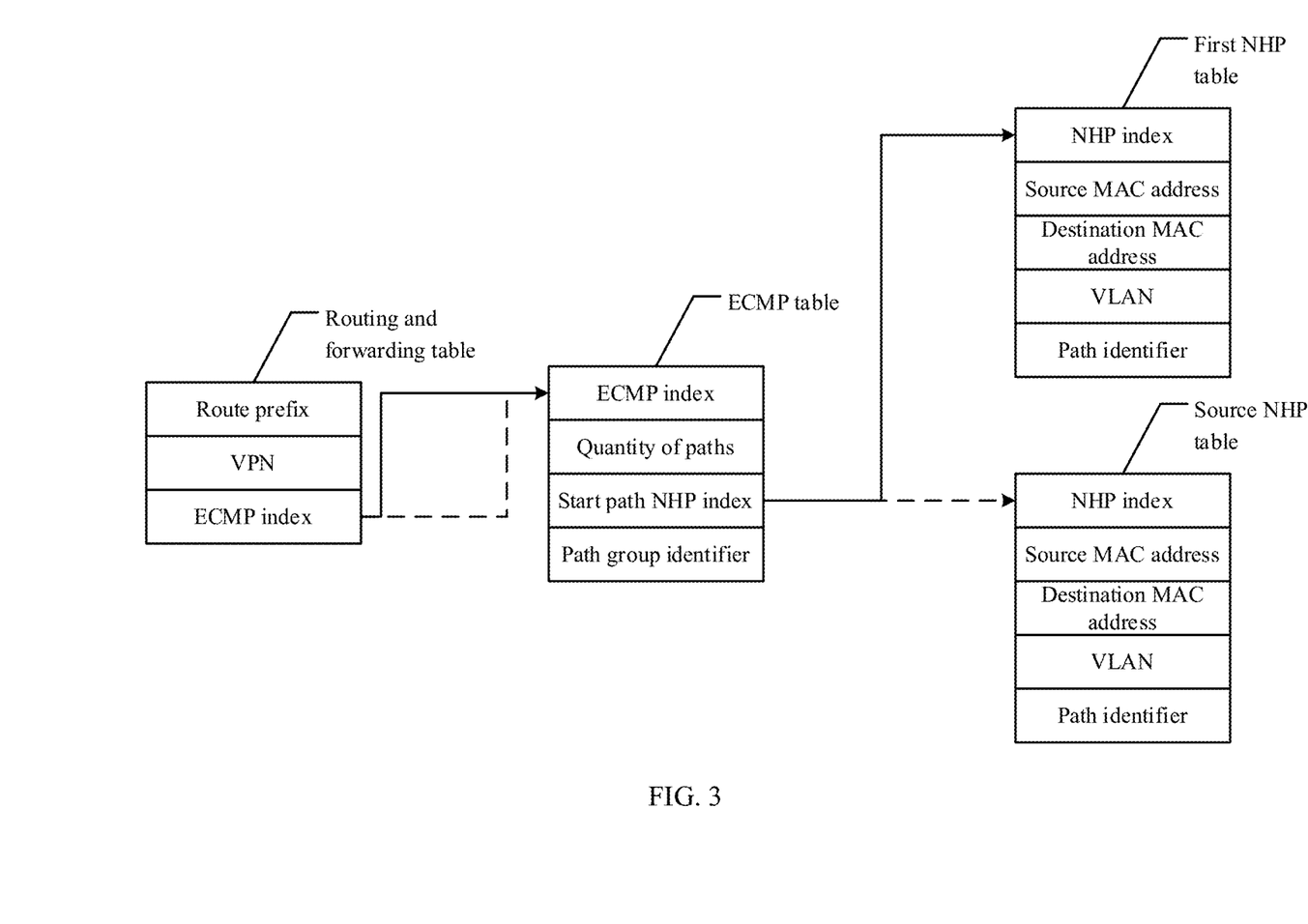
FIG. 3 is a schematic diagram of an application example according to an embodiment of this application.

To further understand the technical solutions provided in the embodiments of this application, the technical solutions are described below with reference to two specific application examples. FIG. 3 is a schematic diagram of an application example according to an embodiment of this application. Both application examples are implemented based on the network architecture shown in FIG. 1, including the following.

Application example 1 (corresponding to the part indicated by the solid line in FIG. 3): It is assumed that all the paths in the first path group are available. When the first terminal needs to send a packet to the second terminal, the first network device may first receive the packet. In this case, after the first network device parses the packet, because the IP address of the packet is IP address 1, the first network device may determine that the active and standby indexes corresponding to the packet are ECMP1 and ECMP2 after searching the routing and forwarding table (Table 4). Then, the first network device searches the ECMP table (Table 5) to obtain information about ECMP1 and ECMP2. Because the path group identifiers corresponding to ECMP1 and ECMP2 are both valid, the first network device preferentially obtains the first NHP table (Table 6) corresponding to ECMP1 based on the active-standby priorities of the path group, obtains, from the first NHP table, information about each active path in the first path group, and selects, based on the path identifier corresponding to each active path, one active path from available active paths to forward the packet.

Application example 2 (corresponding to part indicated by the dashed line in FIG. 3): It is assumed that all the paths in the first path group have failed, and path switching has been completed. When the first terminal needs to send a packet to the second terminal, the first network device may first receive the packet. In this case, after the first network device parses the packet, because the IP address of the packet is the IP address 1, the first network device may determine that the active and standby indexes corresponding to the packet are ECMP1 and ECMP2 after searching the routing and forwarding table (Table 4). Then, the first network device searches the ECMP table (Table 8) to obtain information about ECMP1 and ECMP2. Because the path group identifier corresponding to ECMP1 is invalid and the path group identifier corresponding to ECMP2 is valid, the first network device preferentially obtains the second NHP table (Table 7) corresponding to ECMP2, obtains information about each standby path in the second path group from the second NHP table, and selects, based on the path identifier corresponding to each standby path, one active path from available standby paths to forward the packet.

Figure 4:
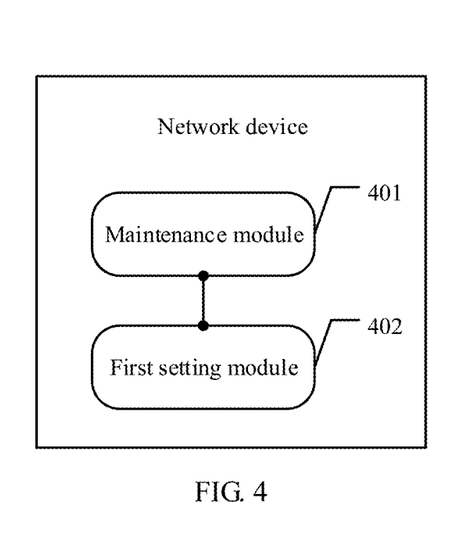
FIG. 4 is a schematic structural diagram of a network device according to an embodiment of this application.

The foregoing has described in detail the path switching method according to the embodiments of this application. The following introduces a structure and a connection relationship of a network device according to an embodiment of this application. FIG. 4 is a schematic structural diagram of the network device according to this embodiment of this application. Referring to FIG. 4, the network device includes:

a maintenance module 401, configured to maintain an equal cost multipath ECMP table, where the ECMP table includes a first ECMP index of a first path group, a first path group identifier corresponding to the first ECMP index, a second ECMP index of a second path group, and a second path group identifier corresponding to the second ECMP index, where the second path group is a standby path group of the first path group; and if a path group identifier corresponding to a path group is set to be valid, the path group includes an available path, or if the path group identifier is set to be invalid, the path group does not include an available path; and a first setting module 402, configured to set the first path group identifier corresponding to the first ECMP index in the ECMP table to be invalid if all paths in the first path group have failed.

Optionally, the maintenance module 401 is further configured to maintain a first next-hop NHP table, where the first NHP table includes each path in the first path group and a path identifier corresponding to each path in the first path group; and if the path identifier of a path in the first path group is set to be valid, the path is available, or if the path identifier is set to be invalid, the path is unavailable.

Optionally, the network device further includes:

a second setting module, configured to: when a path in the first path group has failed, set a path identifier corresponding to the failed path to be invalid in the first NHP table.

Optionally, the first setting module 402 is further configured to set the first path group identifier corresponding to the first ECMP index to be invalid in the ECMP table if all the path identifiers in the first NHP table are set to be invalid.

Optionally, the maintenance module 401 is further configured to maintain a routing and forwarding table, where the routing and forwarding table includes a route prefix, the first ECMP index and the second ECMP index, where the first ECMP index and the second ECMP correspond to the route prefix.

Optionally, the maintenance module 401 is further configured to maintain a second NHP table, where the second NHP table includes each path in the second path group and a path identifier corresponding to each path in the second path group; and if the path identifier of a path in the second path group is set to be valid, the path is available, or if the path identifier is set to be invalid, the path is unavailable.

Figure 5:
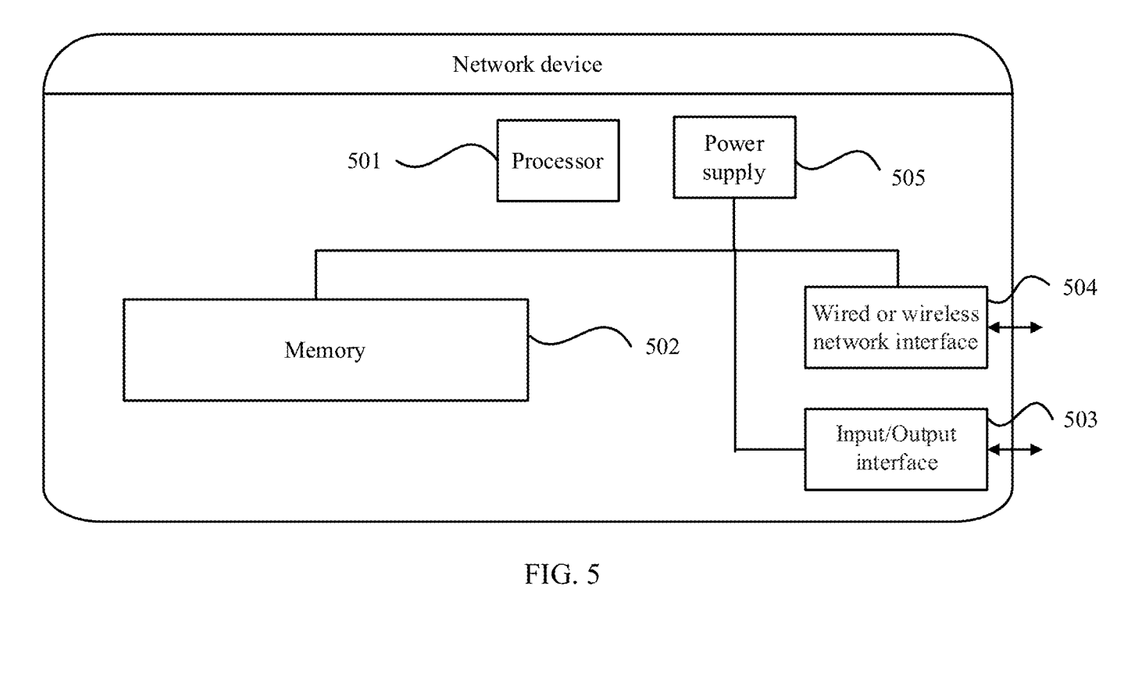
FIG. 5 is a schematic structural diagram of another network device according to an embodiment of this application.

FIG. 5 is another schematic diagram of a network device according to an embodiment of this application. Referring to FIG. 5, the network device includes:

a processor 501, a memory 502, an input/output interface 503, a wired or wireless network interface 504, and a power supply 505.

The memory 502 is a volatile memory or a non-volatile memory, and is configured to store program code.

The processor 501 is configured to communicate with the memory 502 to execute the program code in the memory 502 on the network device, so as to perform the foregoing path switching method.

An embodiment of this application further provides a computer-readable storage medium, where the computer-readable storage medium stores an instruction, and when the instruction runs on a computer, the computer is enabled to perform the foregoing path switching method.

An embodiment of this application further provides a computer program product including an instruction, where when the computer program product runs on a computer, the computer is enabled to perform the foregoing path switching method.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. The depicted division of units described herein is merely one logical division and the functions of the units may be combined or divided in other fashions in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A path switching method, comprising:
    maintaining an equal cost multipath (ECMP) table, wherein the equal cost multipath table comprises a first ECMP index of a first path group, a first path group identifier corresponding to the first ECMP index, a second ECMP index of a second path group, and a second path group identifier corresponding to the second ECMP index; the second path group is a standby path group of the first path group; and a valid path group identifier corresponding to a particular path group indicates that the particular path group comprises an available path; and an invalid path group identifier corresponding to the particular path group indicates that the path group does not comprise an available path; and
    setting the first path group identifier corresponding to the first ECMP index to be invalid in the ECMP table in response to determining that all paths in the first path group have failed.

2. The path switching method according to claim 1, wherein the method further comprises:
    maintaining a first next-hop (NHP) table, wherein the first NHP table comprises each path in the first path group and a path identifier corresponding to each path in the first path group; and a valid path identifier of a particular path in the first path group indicates that the particular path is available, and an invalid path identifier of the particular path in the first path group indicates that the path is unavailable.

3. The path switching method according to claim 2, wherein the method further comprises:
    responsive to determining that the particular path in the first path group has failed, setting the path identifier corresponding to the particular path to be invalid in the first NHP table.

4. The path switching method according to claim 2, wherein the setting the first path group identifier corresponding to the first ECMP index to be invalid in the ECMP table comprises:
    setting the first path group identifier corresponding to the first ECMP index to be invalid in the ECMP table responsive to determining that all the path identifiers in the first NHP table are set to be invalid.

5. The path switching method according to claim 2, wherein the method further comprises:
    maintaining a routing and forwarding table, wherein the routing and forwarding table comprises a route prefix, the first ECMP index and the second ECMP index, wherein the first ECMP index and the second ECMP index correspond to the route prefix.

6. The path switching method according claim 2, wherein the method further comprises:
    maintaining a second NHP table, wherein the second NHP table comprises each path in the second path group and a path identifier corresponding to each path in the second path group; and a valid path identifier of a particular path in the second path group indicates that the path is available, and an invalid path identifier of the particular path indicates that the path is unavailable.

7. A network device, comprising a memory and a processor, wherein:
    the memory is configured to store program codes;
    the processor is configured to execute the program codes to implement a path switching method, wherein the method comprises:
    maintaining an equal cost multipath (ECMP) table, wherein the ECMP table comprises a first ECMP index of a first path group, a first path group identifier corresponding to the first ECMP index, a second ECMP index of a second path group, and a second path group identifier corresponding to the second ECMP index, wherein the second path group is a standby path group of the first path group; and a valid path group identifier corresponding to a particular path group indicates that the particular path group comprises an available path, and an invalid path group identifier corresponding to the particular path group indicates that the particular path group does not comprise an available path; and setting the first path group identifier corresponding to the first ECMP index in the ECMP table to be invalid responsive to determining that all paths in the first path group have failed.

8. The network device according to claim 7, wherein the method further comprises:

maintaining a first next-hop (NHP) table, wherein the first NHP table comprises each path in the first path group and a path identifier corresponding to each path in the first path group; and a valid path identifier of a particular path in the first path group indicates that the particular path is available, and an invalid path identifier of the particular path in the first path group indicates that the particular path is unavailable.

9. The network device according to claim 8, wherein the method further comprises:

responsive to detecting that the particular path in the first path group has failed, setting a path identifier corresponding to the particular path to be invalid in the first NHP table.

10. The network device according to claim 9, wherein the method further comprises:

setting the first path group identifier corresponding to the first ECMP index to be invalid in the ECMP table responsive to determining that all the path identifiers in the first NHP table are set to be invalid.

11. The network device according to claim 8, wherein the method further comprises:

maintaining a routing and forwarding table, wherein the routing and forwarding table comprises a route prefix, the first ECMP index and the second ECMP index, wherein the first ECMP index and the second ECMP index correspond to the route prefix.

12. The network device according to claim 8, wherein the method further comprises:

maintaining a second NHP table, wherein the second NHP table comprises each path in the second path group and a path identifier corresponding to each path in the second path group; and a valid path identifier of a particular path in the second path group indicates that the path is available, and an invalid path identifier of the particular path indicates that the particular path is unavailable.

* * * * *